US008885313B2

(12) United States Patent
Zhou

(10) Patent No.: US 8,885,313 B2
(45) Date of Patent: Nov. 11, 2014

(54) CIRCUIT BREAKER INCLUDING AN ELECTRONIC TRIP CIRCUIT, A NUMBER OF TEMPERATURE SENSORS AND AN OVER-TEMPERATURE TRIP ROUTINE

(71) Applicant: Eaton Corporation, Cleveland, OH (US)

(72) Inventor: Xin Zhou, Franklin Park, PA (US)

(73) Assignee: Eaton Corporation, Cleveland, OH (US)

( * ) Notice: Subject to any disclaimer, the term of this patent is extended or adjusted under 35 U.S.C. 154(b) by 209 days.

(21) Appl. No.: 13/623,394

(22) Filed: Sep. 20, 2012

(65) Prior Publication Data

US 2014/0078633 A1    Mar. 20, 2014

(51) Int. Cl.
*H01H 73/06* (2006.01)

(52) U.S. Cl.
USPC ......................................................... 361/115

(58) Field of Classification Search
CPC ... H01H 53/10; H01H 71/123; H01H 71/125; H01H 83/20; H02H 3/08; H02H 5/041
USPC ......................................................... 361/115
See application file for complete search history.

(56) References Cited

U.S. PATENT DOCUMENTS

| 4,428,022 | A | 1/1984 | Engel et al. |
| 5,525,985 | A | 6/1996 | Schlotterer et al. |
| 5,910,760 | A | 6/1999 | Malingowski et al. |
| 6,031,703 | A | 2/2000 | Serpinet et al. |
| 6,144,271 | A | 11/2000 | Mueller et al. |
| 6,707,652 | B2 | 3/2004 | Engel |
| 6,948,846 | B2 | 9/2005 | Engel |
| 7,148,696 | B2 | 12/2006 | Zhou et al. |
| 7,292,154 | B1 | 11/2007 | Baier et al. |
| 7,400,225 | B2 | 7/2008 | Shea |
| 7,403,129 | B2 | 7/2008 | Zhou et al. |

(Continued)

FOREIGN PATENT DOCUMENTS

| EP | 1 359 655 A2 | 11/2003 |
| EP | 1 939 998 A2 | 7/2008 |
| WO | 2009/095774 A1 | 8/2009 |

OTHER PUBLICATIONS

European Patent Office, "International Search Report and Written Opinion", Oct. 14, 2013, 11 pp.

*Primary Examiner* — Jared Fureman
*Assistant Examiner* — Kevin J Comber
(74) *Attorney, Agent, or Firm* — Eckert Seamans Cherin & Mellott, LLC; Kirk D. Houser; Nathaniel C. Wilks

(57) ABSTRACT

A circuit breaker includes first and second terminals, separable contacts, conductors electrically connecting the contacts between the terminals, and an operating mechanism to open and close the contacts. A current sensor senses current flowing through the contacts and outputs a current value. A number of temperature sensors output a number of temperature values corresponding to a number of the conductors. An electronic trip circuit cooperates with the operating mechanism to trip open the contacts, and includes a processor having a first input inputting the current value, a first routine inputting the current value from the first input and causing the operating mechanism to trip open the contacts responsive to over-current, a number of second inputs inputting the number of temperature values, and a second routine comparing the number of temperature values to a number of limits and causing the operating mechanism to trip open the contacts responsive to over-temperature.

6 Claims, 2 Drawing Sheets

(56) References Cited

U.S. PATENT DOCUMENTS

| | | |
|---|---|---|
| 7,411,403 B2 | 8/2008 | Zhou |
| 7,684,164 B2 | 3/2010 | Wong et al. |
| 7,806,736 B2 | 10/2010 | Alderson et al. |
| 7,808,760 B2 | 10/2010 | Kopelman |
| 7,847,562 B2 | 12/2010 | Montgomery et al. |
| 7,909,664 B2 | 3/2011 | Ilkhanov |
| 7,963,812 B2 | 6/2011 | Ilkhanov |
| 8,047,883 B2 | 11/2011 | Montalbano et al. |
| 8,137,145 B2 | 3/2012 | Joy |
| 8,139,337 B2 | 3/2012 | Baxter et al. |
| 8,159,803 B2 | 4/2012 | Ward et al. |
| 2008/0013596 A1* | 1/2008 | Dunne et al. ............ 374/152 |
| 2013/0076327 A1* | 3/2013 | Wagoner et al. ......... 323/304 |

* cited by examiner

CIRCUIT BREAKER INCLUDING AN ELECTRONIC TRIP CIRCUIT, A NUMBER OF TEMPERATURE SENSORS AND AN OVER-TEMPERATURE TRIP ROUTINE

BACKGROUND

1. Field

The disclosed concept pertains generally to electrical switching apparatus and, more particularly, to circuit breakers including electronic trip units.

2. Background Information

Circuit breakers are generally old and well known in the art. Circuit breakers are used to protect electrical circuitry from damage due to an over-current condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent over-current condition. The bimetal, in turn, unlatches a spring powered operating mechanism, which opens the separable contacts of the circuit breaker to interrupt current flow in the protected power system.

Industrial circuit breakers often use a circuit breaker frame, which houses a trip unit. See, for example, U.S. Pat. Nos. 5,910,760; and 6,144,271. The trip unit may be modular and may be replaced, in order to alter the electrical properties of the circuit breaker.

It is well known to employ trip units which utilize a microprocessor to detect various types of over-current trip conditions and provide various protection functions, such as, for example, a long delay trip, a short delay trip, an instantaneous trip, and/or a ground fault trip. The long delay trip function protects the load served by the protected electrical system from overloads and/or over-currents. The short delay trip function can be used to coordinate tripping of downstream circuit breakers in a hierarchy of circuit breakers. The instantaneous trip function protects the electrical conductors to which the circuit breaker is connected from damaging over-current conditions, such as short circuits. As implied, the ground fault trip function protects the electrical system from faults to ground.

The earliest electronic trip unit circuit designs utilized discrete components such as transistors, resistors and capacitors.

More recently, designs, such as disclosed in U.S. Pat. Nos. 4,428,022; and 5,525,985, have included microprocessors, which provide improved performance and flexibility. These digital systems sample the current waveforms periodically to generate a digital representation of the current. The microprocessor uses the samples to execute algorithms, which implement one or more current protection curves.

Due to improper wiring, faulty terminal or other electrical connections, or a faulty interface of the separable contacts, there could be overheated electrical connections at circuit breaker terminals or overheated separable contacts inside of circuit breakers. This could potentially lead to loss of electrical power, an arc fault or a fire hazard. Circuit breakers including a bimetal thermal trip mechanism or a thermal-magnetic trip mechanism may be able to trip on these types of electrical connection faults since overheating at circuit breaker terminals and/or separable contacts would lead to higher temperatures at the bimetal.

However, no such protection is available when an electronic trip unit is employed since the typical overload or over-current protection is achieved by monitoring current using a current transformer, a Rogowski coil or another current sensor instead of a bimetal thermal trip mechanism.

There is room for improvement in circuit breakers.

SUMMARY

These needs and others are met by embodiments of the disclosed concept in which an electronic trip circuit trips a circuit breaker in response to a faulty circuit breaker electrical connection.

In accordance with the disclosed concept, a circuit breaker comprises: a first terminal; a second terminal; separable contacts; a plurality of conductors electrically connecting the separable contacts between the first terminal and the second terminal; an operating mechanism structured to open and close the separable contacts; a current sensor structured to sense current flowing through the separable contacts and output a current value; a number of temperature sensors outputting a number of temperature values corresponding to a number of the plurality of conductors; and an electronic trip circuit cooperating with the operating mechanism to trip open the separable contacts, the electronic trip circuit comprising a processor including a first input inputting the current value from the current sensor, a first routine inputting the current value from the first input and causing the operating mechanism to trip open the separable contacts responsive to an over-current condition, a number of second inputs inputting the number of temperature values from the number of temperature sensors, and a second routine comparing the number of temperature values to a number of temperature limits and causing the operating mechanism to trip open the separable contacts responsive to an over-temperature condition.

The first terminal may be a line terminal; the second terminal may be a load terminal; the plurality of conductors may comprise a line conductor electrically connected to the line terminal, a load conductor electrically connected to the load terminal and a flexible conductor; the separable contacts may comprise a fixed contact and a movable contact; the operating mechanism may comprise a movable contact arm carrying the movable contact; the flexible conductor may be electrically connected between the movable contact arm and the load conductor; and at least one of the number of temperature sensors may be proximate an electrical connection between the flexible conductor and the load terminal, in order to sense a temperature thereof.

The number of temperature values may be a number of analog temperature values; and the processor may further include an analog-to-digital converter to convert the number of analog temperature values to a number of digital temperature values for input by the second routine.

The number of temperature values may be a number of digital temperature values; and the number of digital temperature values may be input by the second routine.

The number of temperature values may be a plurality of temperature values; and the second routine may determine a maximum temperature value of the plurality of temperature values and compare the maximum temperature value to a single temperature limit to determine the over-temperature condition.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with single-pole and three-pole circuit breakers, although the disclosed concept is applicable to a wide range of circuit breakers having any number of poles.

Figure 1:
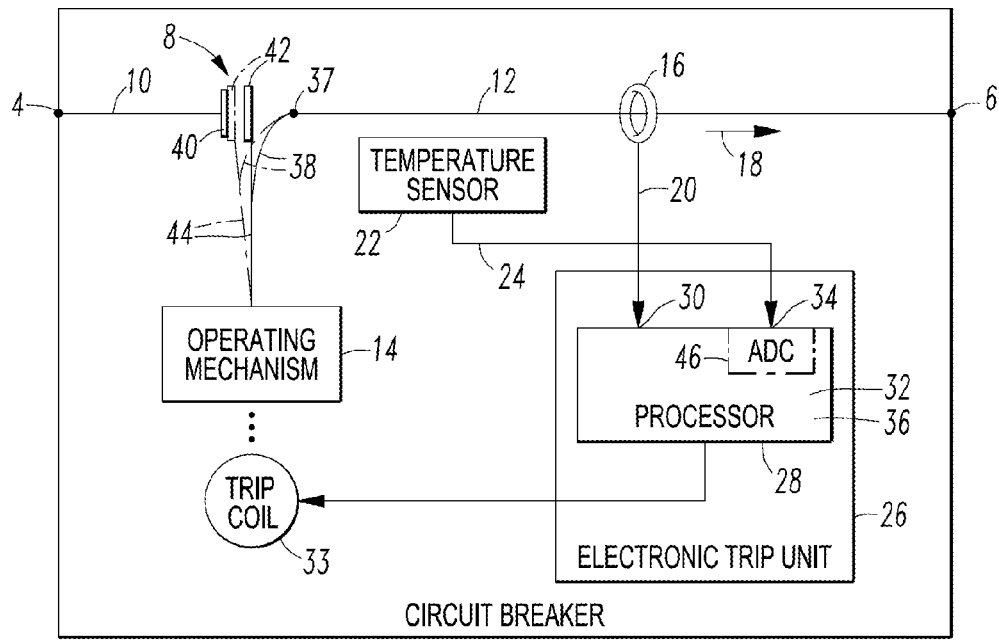
FIG. 1 is a block diagram of a circuit breaker in accordance with embodiments of the disclosed concept.

Referring to FIG. 1, a circuit breaker 2 includes, as is conventional, a first terminal 4, a second terminal 6, separable contacts 8, and a plurality of conductors, such as 10, 12, 38, electrically connecting the separable contacts 8 between the first and second terminals 4, 6. An operating mechanism 14 is structured to open and close the separable contacts 8. A current sensor 16 is structured to sense current 18 flowing through the separable contacts 8 and output a current value 20.

In accordance with the disclosed concept, a number of temperature sensors 22 (only one example temperature sensor 22 is shown in FIG. 1) output a number of temperature values 24 (only one example temperature value 24 is shown in FIG. 1) corresponding to a number of the conductors 10, 12, 38. An electronic trip circuit 26 (e.g., without limitation, an electronic trip unit) cooperates with the operating mechanism 14 to trip open the separable contacts 8. The electronic trip circuit 26 includes a processor 28 having a first input 30 inputting the current value 20 from the current sensor 16, and a conventional first routine 32 (e.g., without limitation, instantaneous trip; I²t; long delay trip; short delay trip; ground fault trip) inputting the current value 20 from the first input 30 and causing the operating mechanism 14 (e.g., without limitation, by energizing a trip coil 33) to trip open the separable contacts 8 responsive to an over-current condition.

In accordance with the disclosed concept, the processor 28 also has a number of second inputs 34 (only one example second input 34 is shown in FIG. 1) inputting the number of temperature values 24 from the number of temperature sensors 22, and a second routine 36 comparing the number of temperature values 24 to a number of temperature limits and causing the operating mechanism 14 to trip open the separable contacts 8 responsive to an over-temperature condition.

Example 1

The first terminal 4 is a line terminal, the second terminal 6 is a load terminal, and the conductors 10, 12, 38 include the line conductor 10 electrically connected to the line terminal 4, the load conductor 12 electrically connected to the load terminal 6 and a flexible conductor 38. The separable contacts 8 include a fixed contact 40 and a movable contact 42. The operating mechanism 14 includes a movable contact arm 44 carrying the movable contact 42 between an open position (shown in FIG. 1) and a closed position (shown in phantom line drawing). The flexible conductor 38 is electrically connected between the movable contact arm 44 and the load conductor 12. At least one of the number of temperature sensors 22 is proximate the electrical connection 37 between the flexible conductor 38 and the load terminal 6, in order to sense a temperature thereof.

Example 2

The number of temperature values 24 is a number of analog temperature values. The processor 28 further includes an analog-to-digital converter (ADC) 46 (shown in phantom line drawing) to convert the number of analog temperature values to a number of digital temperature values for input by the second routine 36. Preferably, the processor 28 also includes a suitable multiplexer (not shown) to permit the analog current value 20 to be converted by the ADC 46 to a digital current value for input by the first routine 32.

Example 3

Alternatively, the number of temperature values 24 is a number of digital temperature values, which are input by the second routine 36.

Example 4

The disclosed electronic trip unit 26 senses a circuit breaker conductor temperature (e.g., without limitation, a temperature of the flexible conductor 38; a temperature of the electrical connection 37 between the flexible conductor 38 and the load conductor 12) and provides the sensed temperature value 24 to the processor 28 (e.g., without limitation, a microprocessor) of the electronic trip unit 26. The temperature of the conductor is employed to determine if there is any overheating at one of the circuit breaker terminals 4, 6 or at an interface between the fixed contact 40 and the movable contact 42 due to the fact that the temperature at the corresponding circuit breaker conductor will increase accordingly as temperatures at the circuit breaker terminals 4, 6 or the separable contacts 8 increase, as will be discussed in connection with FIG. 2.

Example 5

The temperature sensor 22 is preferably relatively compact, such as for example and without limitation, a thermocouple, a wireless passive surface acoustic wave (SAW) temperature sensor, an infrared temperature sensor, or any other suitable current sensor. The sensed temperature value 24 is input by the processor 28 and the second routine 36 thereof to determine if a predetermined temperature level is exceeded. If so, then the electronic trip unit 26 causes the circuit breaker 2 to trip by energizing the trip coil 33.

Example 6

Optionally, a photo-electric coupler, such as an optical isolator (not shown), can be employed between the temperature sensor 22 and the processor 28 to provide electrical isolation when a temperature sensor that does not provide electrical isolation, such as a thermocouple, is employed.

Example 7

Figure 2:
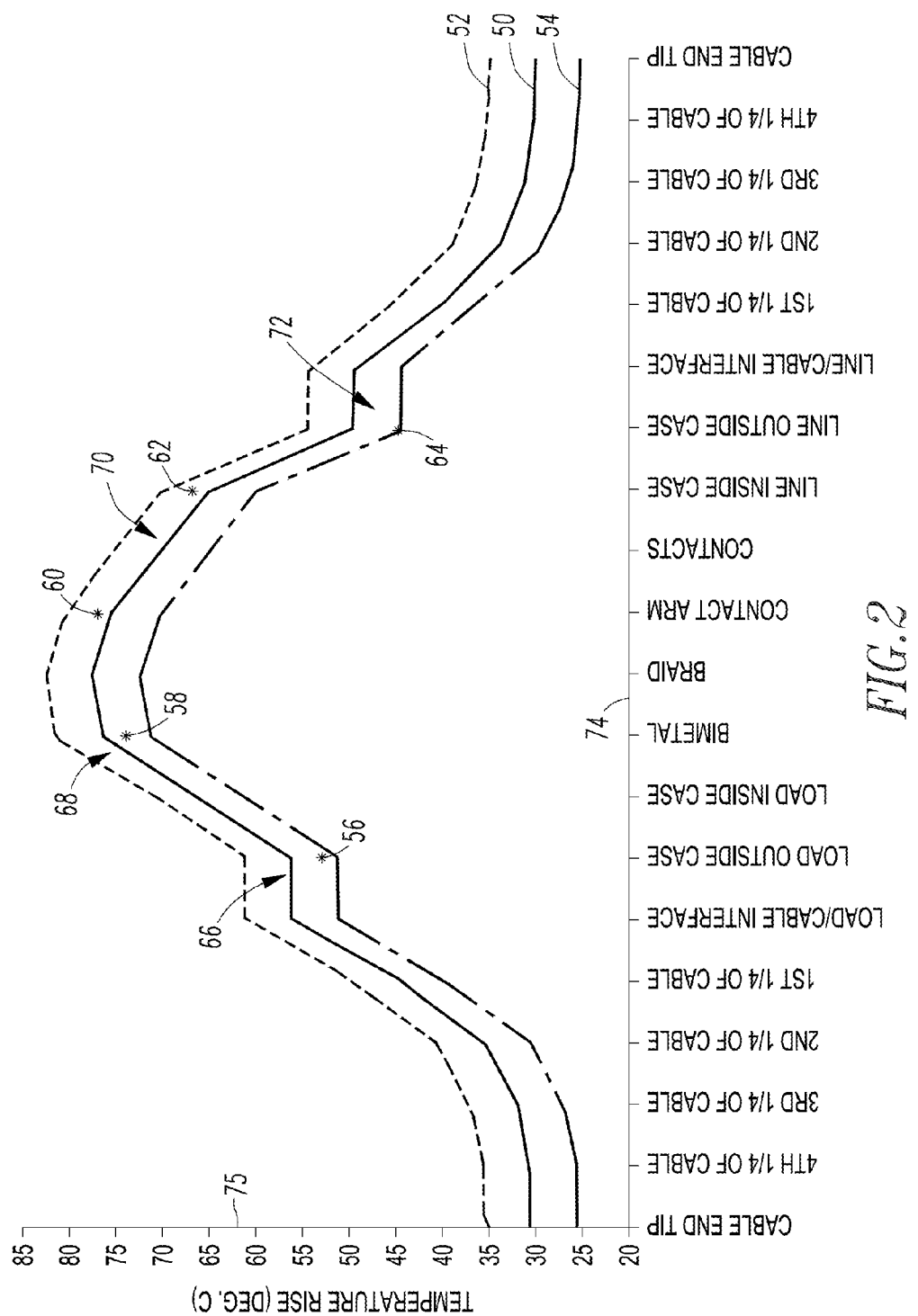
FIG. 2 is a plot showing measured and calculated temperature distributions along a current conducting path of a circuit breaker in accordance with an embodiment of the disclosed concept.

FIG. 2 shows calculated temperature distributions 50, 52, 54 and measured temperatures 56, 58, 60, 62, 64 along the current conducting path (not shown) of an example 225 A molded case circuit breaker (not shown). With reference to FIG. 1, the temperature sensor 22 can be attached to, coupled to or mounted proximate a current-carrying circuit breaker conductor, such as 38 and/or 12, in order to sense the conductor temperature 24. The temperature at the temperature sensor location increases (decreases) as temperatures at the separable contacts 8 and circuit breaker terminals 4, 6 increase (decrease).

The calculated temperature distribution 52 of FIG. 2 has a 5° C. temperature increase with respect to the calculated temperature distribution 50, while the calculated temperature distribution 54 has a 5° C. temperature decrease with respect to the calculated temperature distribution 50. The measured temperatures 56, 58, 60, 62, 64 correspond to five example conductor locations: (1) load terminal location 66; (2) temperature sensor location 68; (3) movable contact arm side of separable contacts location 70; (4) line conductor side of the separable contacts location 70; and (5) line terminal location 72, respectively.

The horizontal axis 74 for the calculated temperature distributions 50, 52, 54 and the measured temperatures 56, 58, 60, 62, 64 is for temperatures corresponding to various locations along a load cable, a load cable terminal interface, a load conductor outside of a circuit breaker, the load conductor inside of the circuit breaker, a bimetal (which need not be part of the disclosed concept), a braid or flexible conductor, a movable contact arm, separable contacts, a line conductor inside of the circuit breaker, the line conductor outside of the circuit breaker, a line cable terminal interface, and various locations along the line cable.

The temperature sensor can be disposed at about the place of a conventional bimetal between the load conductor inside of the circuit breaker and the braid, which is then coupled to the movable contact arm, in order to monitor the current-carrying conductor temperature. This fixed location 68 (which corresponds to the electrical connection 37 between the flexible conductor 38 and the load conductor 12 of FIG. 1) is suitably proximate a location of maximum temperature at about the braid (which corresponds to the flexible conductor 38 of FIG. 1). However, since the braid or flexible conductor 38 moves at one end with the movable contact arm 44 of FIG. 1, the temperature sensor 22 of FIG. 1 is preferably disposed at a fixed (non-moving) location.

In FIG. 2, if, for example, there is a temperature rise above 57° C. at the location of the load cable/load terminal interface for the temperature distribution 50, due to an electrical connection fault at that location, then the temperature rise at the location of the temperature sensor will be higher than 75° C.

Example 8

Figure 3:
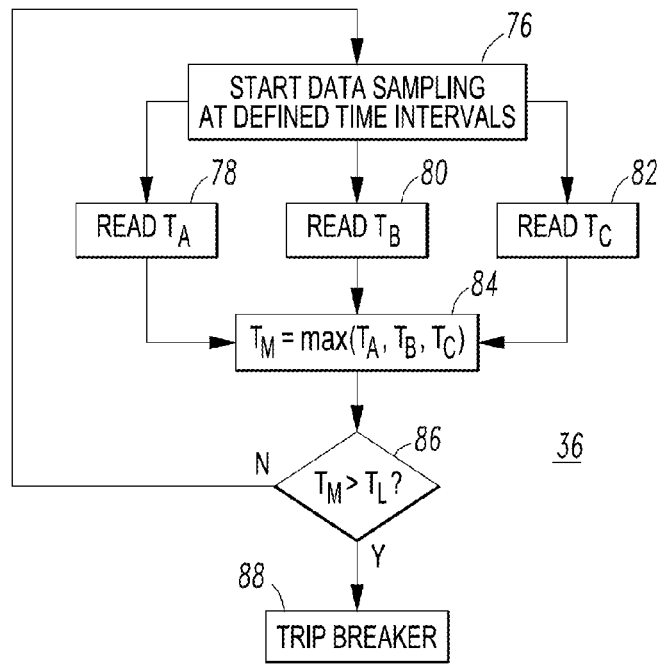
FIG. 3 is a flow chart of a trip routine for the processor of FIG. 1.

FIG. 3 shows the second trip routine 36 for the processor 28 of FIG. 1. In this example, the number of temperature values 24 is a plurality of temperature values ($T_A$, $T_B$ and $T_C$), and the routine 36 determines a maximum temperature value ($T_M$) of the plural temperature values and compares the maximum temperature value ($T_M$) to a predetermined temperature limit ($T_L$) to determine an over-temperature condition.

First, at 76, the routine 36 starts data sampling at suitable predetermined (e.g., without limitation, every 60 seconds; any suitable time interval) time intervals. At, 78, 80 and 82, the respective temperature values $T_A$, $T_B$ and $T_C$ are read from the plurality of temperature sensors 22. Then, at 84, the maximum temperature value ($T_M$) is determined from the maximum of the three example temperature values $T_A$, $T_B$ and $T_C$. At 86, it is determined if the maximum temperature value ($T_M$) exceeds the predetermined temperature limit ($T_L$). If not, then 76 is repeated after the desired time interval. Otherwise, if the maximum temperature value ($T_M$) exceeds the predetermined temperature limit ($T_L$), then, at 88, the trip coil 33 (FIG. 1) is energized to trip open the separable contacts 8 (FIG. 1).

In FIG. 3, the example routine 36 is for a three-phase circuit breaker (not shown) in which three poles (not shown) and three corresponding temperature sensors 22 are employed, one for each pole (FIG. 1 shows a single pole). Alternatively, a plurality of temperature sensors 22 can be employed for a single circuit breaker pole or for a single-pole circuit breaker. Where a plurality of temperature sensors 22 are employed, the maximum temperature value ($T_M$) of plural temperature values measured at different conductor locations (either of a single pole, or from plural poles) is compared to the predetermined temperature limit ($T_L$). Alternatively, a plurality of temperature limits can be employed, one temperature limit for each of the plural temperature values.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit breaker comprising:
a first terminal;
a second terminal;
separable contacts;
a plurality of conductors electrically connecting said separable contacts between said first terminal and said second terminal;
an operating mechanism structured to open and close said separable contacts;
a current sensor structured to sense current flowing through said separable contacts and output a current value;
a number of temperature sensors outputting a number of temperature values corresponding to a number of said plurality of conductors; and
an electronic trip circuit cooperating with said operating mechanism to trip open said separable contacts, said electronic trip circuit comprising a processor including a first input inputting the current value from said current sensor, a first routine inputting the current value from the first input and causing said operating mechanism to trip open said separable contacts responsive to an over-current condition, a number of second inputs inputting the number of temperature values from said number of temperature sensors, and a second routine comparing the number of temperature values to a number of temperature limits and causing said operating mechanism to trip open said separable contacts responsive to an over-temperature condition,
wherein said first terminal is a line terminal; wherein said second terminal is a load terminal; wherein said plurality of conductors comprise a line conductor electrically connected to said line terminal, a load conductor electrically connected to said load terminal and a flexible conductor; wherein said separable contacts comprise a fixed contact and a movable contact; wherein said operating mechanism comprises a movable contact arm carrying said movable contact; wherein the flexible conductor is electrically connected between the movable contact arm and the load conductor; and wherein at least one of said number of temperature sensors is proximate an electrical connection between the flexible conductor and the load terminal, in order to sense a temperature thereof.

2. The circuit breaker of claim 1 wherein the number of temperature values is a number of analog temperature values; and wherein said processor further includes an analog-to-digital converter to convert the number of analog temperature values to a number of digital temperature values for input by the second routine.

3. The circuit breaker of claim 1 wherein the number of temperature values is a number of digital temperature values; and wherein the number of digital temperature values are input by the second routine.

4. The circuit breaker of claim 1 wherein the number of temperature values is a plurality of temperature values; and wherein the second routine determines a maximum temperature value of the plurality of temperature values and compares the maximum temperature value to a single temperature limit to determine the over-temperature condition.

5. The circuit breaker of claim 1, wherein the number of temperature sensors include at least one wireless passive surface acoustic wave temperature sensor.

6. The circuit breaker of claim 1, further comprising:
a photo-electric coupler employed between at least one of the number of temperature sensors and the electronic trip circuit.

* * * * *